US 9,482,687 B2

(12) United States Patent
Acker

(10) Patent No.: US 9,482,687 B2
(45) Date of Patent: Nov. 1, 2016

(54) DEVICE FOR MEASURING ANGLE AND ANGULAR VELOCITY OR DISTANCE AND SPEED

(75) Inventor: Heinrich Acker, Schwalbach (DE)

(73) Assignee: Continental Teves AG & Co. oHG (DE)

(*) Notice: Subject to any disclaimer, the term of this patent is extended or adjusted under 35 U.S.C. 154(b) by 304 days.

(21) Appl. No.: 14/130,587

(22) PCT Filed: Jun. 26, 2012

(86) PCT No.: PCT/EP2012/062293
§ 371 (c)(1),
(2), (4) Date: Jan. 2, 2014

(87) PCT Pub. No.: WO2013/004540
PCT Pub. Date: Jan. 10, 2013

(65) Prior Publication Data
US 2014/0116132 A1   May 1, 2014

(30) Foreign Application Priority Data

Jul. 6, 2011   (DE) .................. 10 2011 078 717

(51) Int. Cl.
G01P 3/48   (2006.01)
G01P 3/481  (2006.01)
(Continued)

(52) U.S. Cl.
CPC .............. G01P 3/48 (2013.01); G01P 3/481 (2013.01); G01P 3/486 (2013.01); G01P 3/487 (2013.01); G01P 3/488 (2013.01)

(58) Field of Classification Search
CPC .................. G01P 3/48; G01P 3/487
USPC .............................. 73/504
See application file for complete search history.

(56) References Cited

U.S. PATENT DOCUMENTS 3,930,201 A * 12/1975 Ackermann ......... F02P 5/15
                                                     307/106
4,072,893 A   2/1978 Huwyler
(Continued)

FOREIGN PATENT DOCUMENTS

DE   26 41 592 A1   3/1978
DE   42 44 291 A1   6/1994
(Continued)

OTHER PUBLICATIONS

International Search Report corresponding to PCT/EP2012/062293 dated Apr. 4, 2013.
(Continued)

Primary Examiner — John Chapman, Jr.
(74) Attorney, Agent, or Firm — RatnerPrestia

(57) ABSTRACT

A device for measuring angle and angular velocity or distance and speed of a moving part is described. The device has a sensor which is or can be arranged in a stationary manner and an encoder which is or can be arranged on the moving part and, together with the sensor, generates a modulation signal to be demodulated by the sensor. For the frequency measurement which is needed to measure the angular velocity/speed, the encoder has a structure which reproduces a periodic pattern and is interrupted by at least one index area for the angle/distance measurement. In the index area, the encoder has a substitute pattern which differs from the periodic pattern by at least one physical variable which can be detected by the sensor but has a structure which also enables the frequency measurement in the index area.

6 Claims, 3 Drawing Sheets

(51) Int. Cl.
*G01P 3/486* (2006.01)
*G01P 3/487* (2006.01)
*G01P 3/488* (2006.01)

(56) References Cited

U.S. PATENT DOCUMENTS

| | | | |
|---|---|---|---|
| 4,121,112 A | 10/1978 | Hartig | |
| 4,166,977 A | 9/1979 | Glauert et al. | |
| 4,760,827 A | 8/1988 | Schreiber et al. | |
| 4,866,269 A * | 9/1989 | Wlodarczyk | F02D 41/009 250/231.18 |
| 5,461,311 A | 10/1995 | Nakazato et al. | |
| 5,661,296 A * | 8/1997 | Ishizuka | G01D 5/38 250/231.14 |
| 6,404,188 B1 * | 6/2002 | Ricks | F02D 41/009 123/146.5 A |
| 2010/0245007 A1* | 9/2010 | Nakagawa | G01P 3/487 335/302 |
| 2013/0151194 A1* | 6/2013 | Hawken | F02D 41/009 702/151 |

FOREIGN PATENT DOCUMENTS

| | | |
|---|---|---|
| DE | 10 2008 020455 A1 | 10/2009 |
| EP | 0 871 013 A2 | 3/1998 |
| WO | WO 88/06717 | 9/1988 |
| WO | WO 2010/086585 A1 | 8/2010 |

OTHER PUBLICATIONS

German Search Report corresponding to DE 10 2011 078 717.8, dated Oct. 21, 2011.
Written Opinion corresponding to PCT/EP2012/062293.
English translation of Chinese Office Action mailed Jul. 31, 2014 in counterpart Chinese Application No. 201280033485.3.

* cited by examiner

DEVICE FOR MEASURING ANGLE AND ANGULAR VELOCITY OR DISTANCE AND SPEED

CROSS REFERENCE TO RELATED APPLICATIONS

This application is the U.S. National Phase Application of PCT International Application No. PCT/EP2012/062293, filed Jun. 26, 2012, which claims priority to German Patent Application No. 10 2011 078 717.8, filed Jul. 6, 2011, the contents of such applications being incorporated by reference herein.

FIELD OF THE INVENTION

The present invention relates to a device for measuring angle and angular velocity or distance and speed of a moving part, having a sensor which is or can be arranged in a stationary manner and an encoder, which is or can be arranged on the moving part and together with the sensor generates a modulation signal to be demodulated by the sensor, wherein, for the frequency measurement necessary for the angular velocity/speed measurement, the encoder has a structure which replicates a periodic pattern and is interrupted by at least one index region for the angle/distance measurement.

Such devices are used both for linear distance and speed measurements and for angle and angular velocity, or rotational speed, measurements, on the one hand linear and on the other hand annular encoders being used. The present invention relates to both types of measurement devices.

BACKGROUND OF THE INVENTION

The measurement of a rotational speed, which is required for many machines and systems in technology, is physically equivalent to the measurement of angular velocity. It is generally known to measure the rotational speeds of shafts by applying, circumferentially on the shaft, an encoder in the form of a periodic pattern, for example a toothed wheel, which is sampled by a sensor applied in a stationary manner next to the shaft. The sensor has the capability of distinguishing a tooth and tooth gap or other periodically varying properties or physical quantities, for example magnetic field direction or optical transparency. The sensor thereupon generates an output signal, which has the same periodicity as the sampled pattern.

When, in connection with a rotational speed/angular velocity measurement or speed measurement, an absolute position or an absolute angle needs to be identified, it is known to use a separate additional system which, instead of the periodic pattern, has an index marking or a plurality of index markings. When the index marking is identified by the separate system, the sensor is at the index position, that is to say a position or an angle whose absolute value is known. The overall system can determine all subsequent positions or angles by recording the change starting from the index position with the aid of the periodic pattern.

For cost reasons, however, for example for applications in motor vehicles, a separate system for identifying an absolute position is often avoided even though an absolute measurement is necessary. Then, the periodic pattern of the system used for the angular velocity/speed measurement is interrupted at a position. From the interruption of the otherwise periodic signal sequence, the index position can thus be deduced. A prerequisite for this is merely limitation of the acceleration, or angular acceleration, so that an interruption of the signal sequence at the index position can be distinguished from the regular sequence with the greatest delay. This is generally the case in technical applications owing to the inertia of the system, or may readily be induced by selection of the parameters of the periodic pattern.

As mentioned, the periodic structure of the single encoder must be interrupted at a position in order to avoid the costs of an additional system. This is usually done by omitting the periodic structure for two periods, for example by means of two missing teeth in the series of teeth. The index position can thereby be identified reliably. For the frequency measurement which is necessary for the angular velocity/speed measurement, however, a new problem arises since the frequency is now temporarily broken and an interpolation or extrapolation method is needed in order to be able to measure the frequency over the index position, without the index marking making a false contribution.

An interpolation is sufficient if the signal is to be output with a delay. In the case of undelayed output, an extrapolation is necessary.

SUMMARY OF THE INVENTION

An aspect of the present invention provides an economical device of the type mentioned in the introduction, which, with a simple structure, allows particularly accurate angular velocity/speed measurement.

In the case of a device of the type mentioned in the introduction, this object is achieved in accordance with an aspect of the invention in that, in the index region, the encoder has a substitute pattern which differs from the periodic pattern by at least one physical quantity that can be registered by the sensor, but has a structure which also permits the frequency measurement in the index region.

The device formed according to the invention requires only a system with a pattern and an index marking, and therefore only one sampling sensor, in order to carry out both types of measurement. The device permits an absolute measurement by index marking and is furthermore formed in such a way that an accurate frequency measurement can be carried out over the index position without interpolation or extrapolation. It is to be understood that the encoder in this case constitutes only a part of the measurement system, and the sampling sensor is provided with the properties suitable therefor.

An aspect of the present invention is based on the concept of not fully interrupting the periodic pattern at the index marking or in the index region (in the sense of an unstructured surface), but replacing it with another pattern. This substitute pattern has the feature that it can be clearly distinguished from the periodic pattern by at least one property or physical quantity, but at the same time forms a structure which supports the frequency measurement. This support consists in changes of the sensor signal taking place at particular positions or angles within the index region, so that the frequency measurement can relate to the real movement progress in the index region as well, instead of an interpolation or extrapolation in the sense of the continuation of the movement that was taking place when entering the index region.

Since, in the known procedure by interpolation or extrapolation, the time of emergence from the index region is not yet known, only the movement state upon entry can be used as a basis, either by assuming a constant speed or by assuming a constant acceleration. The measurement inaccuracy when passing through the index region therefore becomes ever greater. In contrast thereto, in the invention the structure of the substitute pattern offers assistance by the actual position (or the actual angle) within the index region being measurable.

The sensor has the task of identifying the transition between the periodic pattern and the substitute pattern, while the frequency measurement, which is based on the periodicity of the periodic pattern, is interfered with little or not at all. In this case, for example, it is also possible to switch over between two measurement methods to be used regionally, one in the region of the periodic pattern and one in the index region.

Preferably, in the device formed according to the invention, the sensor and the encoder are formed in such a way that a modulated signal is generated with a carrier frequency and two different "messages" modulated on for the index region and the remaining region of the encoder. The sensor is in this case preferably formed in terms of circuit technology in such a way that it extracts the carrier frequency and demodulates the transmitted "message".

The signal which is delivered by the sensor element (the physical transducer) owing to the effect of the encoder is considered as a modulated signal, the frequency to be measured (which represents the speed or the angular velocity) constituting the carrier, while the periodic pattern and the substitute pattern constitute two different "messages" modulated on. The sensor then has the task of extracting the carrier frequency and of demodulating the "transmitted message". Depending on the modulation method, very different circuit parts may be necessary for this. According to the invention, therefore, the sensor is preferably formed as a receiver for signals modulated according to known modulation methods with known receiver circuit concepts.

The device formed according to the invention (encoder with corresponding sensor) can be used for the measurement of rotational movements and linear movements. Besides general applications on any rotating shafts or linearly moved machine or vehicle parts, the following application fields are important in particular: measurement on wheels of vehicles (wheel speed sensors), measurement on crankshafts of internal-combustion engines, measurement on the drivetrain components of motor vehicles, for example transmissions.

In a preferred embodiment of the invention, the periodic pattern is also present continuously in the index region, but with a different amplitude therein than the remaining region. In this embodiment, amplitude modulation (AM) is therefore used, in particular with a modulation factor m<1, or amplitude shift keying (ASK). In this embodiment of the invention, the periodic pattern is present continuously but with variable amplitude. The device for extraction of the carrier is sensitive enough to be able to work with both amplitudes, while the demodulation delivers different binary values for the pattern and the substitute pattern. For the practical configuration of the encoder with a different pattern amplitude, the following may for example be envisioned: teeth of different length or shape, different material thickness, different material, different distance from the sensor element, etc.

In another preferred embodiment of the device formed according to the invention, the periodic pattern is replaced in the index region with a pattern of the same type with a different frequency. In this case, frequency modulation (FM) or frequency shift keying (FSK) is used. The periodic pattern is replaced in the index region with a pattern of the same type with a different frequency, in particular double the frequency. Particularly with digital circuit technology, it is easy to halve the double frequency in the index region, in order to obtain a continuous frequency signal which is in no way impaired by the index marking. As in the embodiment described above, here again two periods of the pattern may preferably be modified. How many periods are modified is, however, ultimately unimportant for the functionality.

In yet another embodiment of the invention, a pattern corresponding to a phase modulation is provided in the index region. In this embodiment, phase modulation (PM) or phase shift keying (PSK) is used. For example, one tooth is arranged offset by 90° in the array of the other teeth and leads to an inverted binary signal in a suitable demodulator. The advantage over AM (ASK) and FM (FSK) in this case resides in the lesser requirements for the amplitude of the signal. While two very different amplitudes have to be processed directly in AM, and in FM—depending on the physical implementation—different amplitudes may be caused by a frequency dependency of the sensitivity, in the case of PM there is no need for a reservation in this regard. In the present embodiment, an offset of only one pattern period is regarded as preferred, because a particularly high apparent temporary frequency change is induced in this case (phase shift by 90° then immediately, starting from the new instantaneous value, by −90°), which can be separated particularly easily from rotational speed changes.

According to an aspect of the invention, therefore, a device for measuring angle and angular velocity or distance and speed is provided, which comprises an encoder and an associated sensor. Further circuit parts, if these are required, are not described here. Their arrangement is at the discretion of the person skilled in the art. The encoder and the sensor together generate a modulation signal, which is to be demodulated by the sensor. The carrier is extracted for the frequency measurement. The demodulated signal is used in order to find one or more identical or different index markings, which are used for an absolute distance or angle measurement. The corresponding modulation is generated by the encoder, specifically by structuring any desired physical quantity along the measurement direction. The sensor uses a demodulation method corresponding to the structuring, in order to find the index markings. The frequency measurement is not impaired, or impaired only slightly, by the modulation.

The term "sensor" used here therefore refers to the sensor element per se, which generates the signal together with the encoder, and to the associated signal processing/evaluation unit. Known elements/circuits may be used for these parts.

The physical quantity which can be recorded by the sensor (sensor element) may be of any nature, for example of a geometrical type (tooth/tooth area), magnetic type or optical type. In any event, the invention covers all possible types of recordable physical quantities.

The following methods are preferably used for the modulation: AM (ASK), FM (FSK), PM (PSK), subforms and mixed forms of modulation methods, such as QAM (quadrature amplitude modulation), QPSK (quadrature phase shift keying), 4-PSK, 8-PSK, 16-QAM, etc. (a plurality of bits per symbol, attractive for distinguishing many index markings), and owing to the close relationship also pulse modulation methods (sometimes not distinguishable from PSK in terms of the signal form), such as PPM (pulse-pause modulation, pulse-phase modulation) and for cases with analog signal processing (entails less circuit outlay, but digital generally preferred if possible), AM, FM, PM.

It should be pointed out that the procedure according to the prior art, in which the periodic pattern of a system is simply interrupted at a position (index region), may also be regarded as amplitude modulation (AM) with the modulation factor m=1, or as OOK (on-off keying). This procedure or method variant of the prior art is not included by the invention, since the invention specifically requires a substitute pattern in the index region.

The encoder is preferably formed as a permanent magnetic encoder.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

The encoder forms depicted in FIGS. 1-4 are represented linearly for the sake of graphical simplicity. The structure of the encoder along the measurement coordinate nevertheless likewise applies for annular encoders. The representation then corresponds to a corresponding development. The movement direction is illustrated by the arrow.

The schematic representations selected for the encoder forms do not relate to the precise geometry of the respective pattern, but merely by way of example involve the representation of a tooth and tooth gap per se. The different nature of encoders, i.e. the physical quantity which modulates within the pattern, is not taken into account in this case. All modulating quantities, whether geometrical, magnetic, optical or other, are symbolized by way of example by a tooth and tooth gap.

The representation of the encoder forms always shows only one index marking. Variation in terms of occurrence, parameter or type of the index marking within an encoder is possible.

Furthermore, no indications are given in the exemplary embodiments regarding the formation of the respective sensor. In particular, the procedure during the demodulation is not described in detail, rather only the modulation method to be selected is indicated. At the two outputs of the circuit, which is regarded as known, the carrier frequency and the demodulated signal are then provided.

Figure 5:
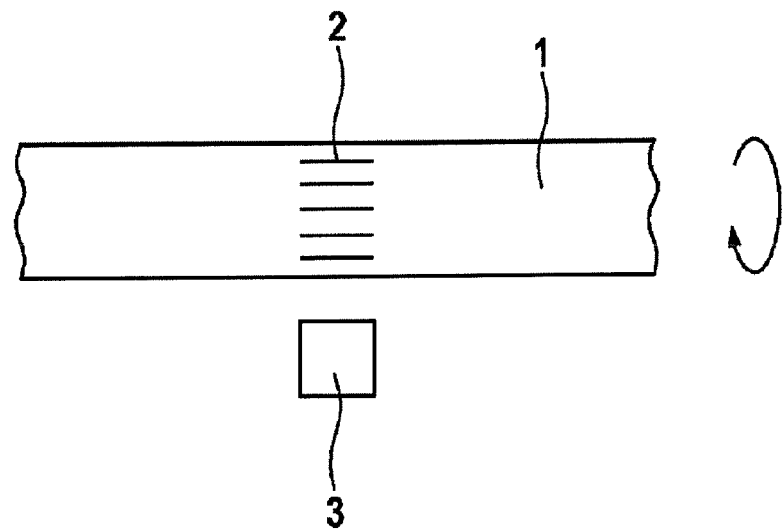
FIG. 5 shows a schematic representation of a device for measuring angle and angular velocity (rotational speed).

FIG. 5 schematically represents a device for angle or angular velocity measurement. The device has an encoder 2 arranged on the surface of a rotating part, for example a shaft 1, and a stationary sensor 3 arranged in proximity to the encoder. The encoder 2 has a structure which replicates a periodic pattern and which, for example, may involve individual teeth. The index region provided is not specially represented in this case.

Figure 1:
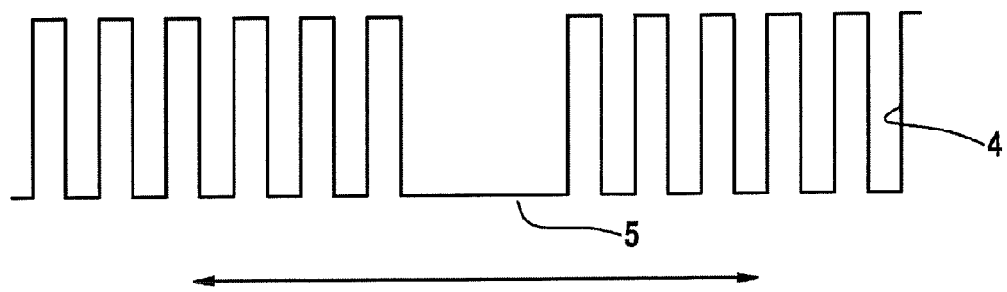
FIG. 1 shows a schematic representation of an encoder form according to the prior art.

FIG. 1 shows an encoder according to the prior art. The figure shows a series of teeth which form a periodic pattern 4, two teeth being missing in an index region 5.

Figure 2:
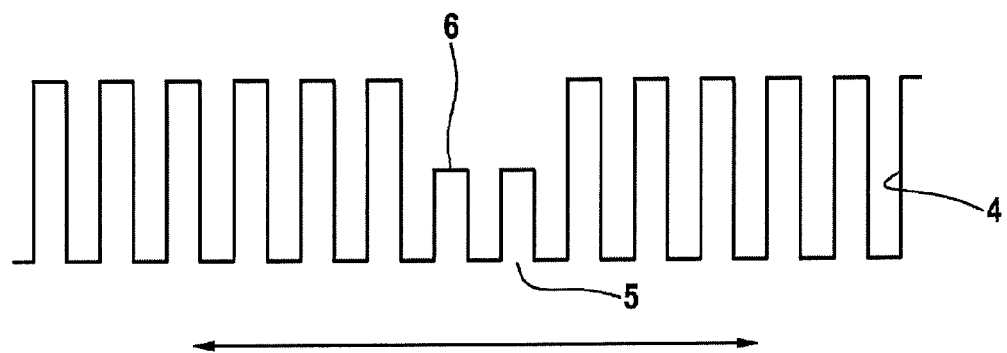
FIG. 2 shows a schematic representation of an encoder form according to a first embodiment of the invention.

FIG. 2 shows a first embodiment of the invention, in which the encoder again has a series of teeth which form a periodic pattern 4. In this case, two teeth 6 are provided with a shorter length in the index region 5, so that the amplitude modulation (AM) with a modulation factor m<1 as described above can be used in this embodiment.

Figure 3:
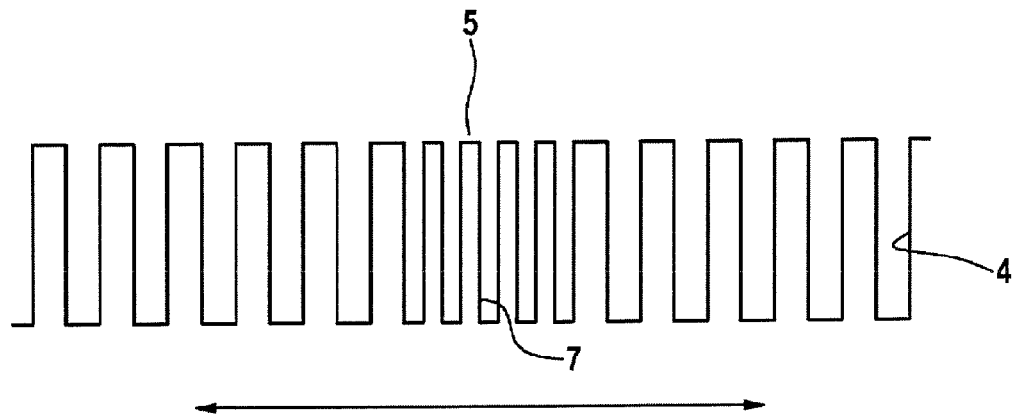
FIG. 3 shows a schematic representation of an encoder form according to a second embodiment of the invention.

In the embodiment of FIG. 3, the encoder has a series of teeth which likewise form a periodic pattern 4, a tooth pattern 7 of the same type with double the frequency in this case being present in the index region 5. For this device, the frequency modulation (FM) described above is used.

Figure 4:
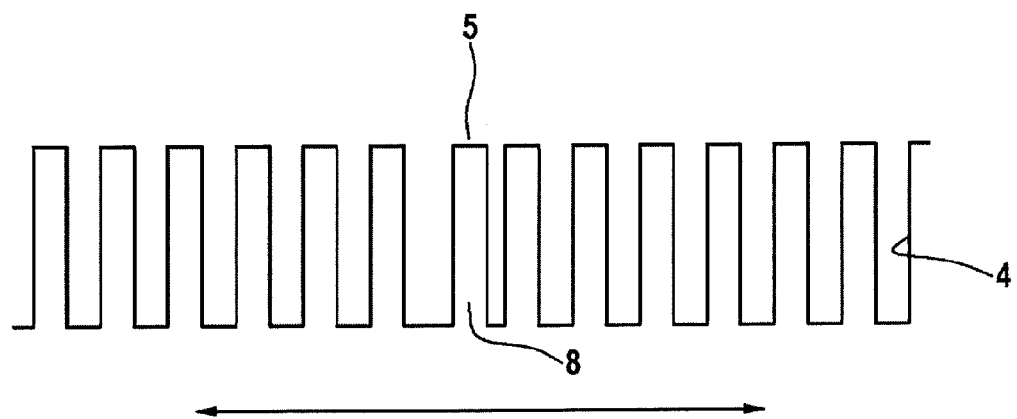
FIG. 4 shows a schematic representation of an encoder form according to a third embodiment of the invention.

In the encoder represented in FIG. 4, in the index region 5 the periodic tooth pattern 4 has a tooth 8 offset by 90° in the array relative to the other teeth. In this embodiment, the phase modulation (PM) described above is used.

The invention claimed is:

1. A device for measuring angle and angular velocity or distance and speed of a moving part using phase modulation, comprising:
   a sensor which is or can be arranged in a stationary manner; and
   an encoder, which is or can be arranged on the moving part and together with the sensor generates a modulation signal to be demodulated by the sensor,
   wherein, for the frequency measurement necessary for the angular velocity/speed measurement, the encoder has a tooth structure which replicates a periodic pattern and is interrupted by at least one index region for the angle/distance measurement, wherein in the index region, the encoder has a substitute structure which differs from the structure which replicates the periodic pattern by a phase shift in the teeth that can be registered by the sensor, but also permits the frequency measurement in the index region.

2. The device as claimed in claim 1, wherein the sensor and the encoder are formed in such a way that a modulated signal is generated with a carrier frequency and two different "messages" modulated on for the index region and the remaining region of the encoder.

3. The device as claimed in claim 2, wherein the sensor is formed in terms of circuit technology in such a way that it extracts the carrier frequency and demodulates the transmitted "message".

4. The device as claimed in claim 1, wherein the periodic pattern is also present continuously in the index region.

5. The device as claimed in claim 1, wherein the device is formed as a rotational speed measurement device.

6. The device as claimed in claim 1, wherein the encoder is formed as a permanent magnetic encoder.

* * * * *